US008660005B2

(12) United States Patent
Roitshtein et al.

(10) Patent No.: US 8,660,005 B2
(45) Date of Patent: Feb. 25, 2014

(54) LOAD BALANCING HASH COMPUTATION FOR NETWORK SWITCHES

(75) Inventors: Amir Roitshtein, Holon (IL); Tal Mizrahi, Haifa (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 113 days.

(21) Appl. No.: 13/305,807

(22) Filed: Nov. 29, 2011

(65) Prior Publication Data

US 2012/0134266 A1 May 31, 2012

Related U.S. Application Data

(60) Provisional application No. 61/418,362, filed on Nov. 30, 2010.

(51) Int. Cl.
*H04L 1/00* (2006.01)

(52) U.S. Cl.
USPC .................. 370/235; 370/395.32; 370/400

(58) Field of Classification Search
USPC .......... 370/235, 389, 392, 400, 401, 428, 429
See application file for complete search history.

(56) References Cited

U.S. PATENT DOCUMENTS

| | | | |
|---|---|---|---|
| 6,249,521 B1 | 6/2001 | Kerstein | |
| 6,614,758 B2 | 9/2003 | Wong et al. | |
| 6,973,082 B2 | 12/2005 | Devi et al. | |
| 7,190,696 B1 | 3/2007 | Manur et al. | |
| 7,554,914 B1 | 6/2009 | Li et al. | |
| 7,623,455 B2 | 11/2009 | Hilla et al. | |
| 7,639,614 B2 | 12/2009 | Nakagawa et al. | |
| 7,796,594 B2 | 9/2010 | Melman et al. | |
| 7,898,959 B1 | 3/2011 | Arad | |
| 8,339,951 B2 | 12/2012 | Scaglione | |
| 8,355,328 B2 | 1/2013 | Matthews et al. | |
| 2002/0093952 A1* | 7/2002 | Gonda | 370/369 |
| 2003/0210688 A1* | 11/2003 | Basso et al. | 370/389 |
| 2004/0073640 A1 | 4/2004 | Martin et al. | |
| 2008/0031263 A1 | 2/2008 | Ervin et al. | |
| 2008/0181103 A1* | 7/2008 | Davies | 370/230 |
| 2011/0102612 A1 | 5/2011 | Iwata | |
| 2011/0134925 A1 | 6/2011 | Safrai et al. | |

OTHER PUBLICATIONS

Mizrahi et al., U.S. Appl. No. 12/537,078, filed Aug. 6, 2009.
Thaler et al., "Multipath Issues in Unicast and Multicast Next-Hop Selection," The Internet Society, 2000, 10 pages.

* cited by examiner

*Primary Examiner* — Pao Sinkantarakorn

(57) ABSTRACT

Techniques to load balance traffic in a network device or switch include a network device or switch having a first interface to receive a data unit or packet, a second interface to transmit the packet, and a mapper to map between virtual ports and physical ports. The network device includes hash value generator configured to generate a hash value based on information included in the packet and based on at least one virtual port. The hash value may be optionally modified to load balance egress traffic of the network device. The network device selects a particular virtual port for egress of the packet, such as by determining an index into an egress table based on the (modified) hash value. The packet is transmitted from the network device using a physical port mapped to the particular virtual port.

18 Claims, 9 Drawing Sheets

|   Input 202   |   Output 205   |
|---|---|
| 202a —— 00 | F2 —— 205a |
| . | . |
| . | . |
| 202b —— 03 | 8A —— 205b |
| . | . |
| . | . |
| 202n —— 255 | FF —— 205n |

LOAD BALANCING HASH COMPUTATION FOR NETWORK SWITCHES

CROSS REFERENCE TO RELATED APPLICATION

This application claims benefit of U.S. Provisional Patent App. No. 61/418,362, entitled "Load Balancing Hash Computation for Networks," and filed on Nov. 30, 2010, the entire disclosure of which is hereby expressly incorporated by reference herein.

This application is related to U.S. patent application Ser. No. 12/537,078, entitled "Hash Computation for Network Switches," and filed on Aug. 6, 2009, the entire disclosure of which is hereby expressly incorporated by reference herein.

FIELD OF TECHNOLOGY

The present disclosure relates generally to communication systems and, more particularly, to computing hash values for data units at a computing or network device.

BACKGROUND

Today, hash functions are widely used in a variety of computing applications to map data in a larger set to a value in a smaller set. For example, a relatively long sequence of bits may be supplied as an input into a mathematical function to generate a shorter sequence of bits that serves as an index into a database table.

One area of application in which hashing can be particularly useful is network switching. In general, a network switch may receive and transmit data packets via multiple ports. In some situations, there may be more than one possible network link via which a packet can be transmitted to properly forward the data packet to its destination. Moreover, network links sometimes are purposefully aggregated to provide more bandwidth between communicating devices or networks. Grouping links together to define wider communication channels is known as link aggregation (LAG). In those situations where multiple links present equally attractive routing choices to a network switch, the routing technique is typically referred to as equal-cost multi-path (ECMP) routing.

SUMMARY OF THE DISCLOSURE

Embodiments of a method for load balancing traffic in a network device include receiving a data unit at the network device via a first physical port, determining a first virtual port corresponding to the first physical port, and determining an initial key based on information included in the data unit. Additionally, the method includes determining a hash value corresponding to the data unit based on the initial key and associated with at least one virtual port of the network device, and determining, based on the hash value, a second virtual port to which the data unit is to be forwarded. The method further includes determining a second physical port corresponding to the second virtual port, and causing the data unit to be egressed from the network device via the second physical port.

Embodiments of a load-balancing network device include a first network interface to receive a data unit, a mapper to map physical ports to virtual ports, and a hash value generator to determine a hash value corresponding to the data unit. The hash value is based on information included in the data unit, and the hash value is associated with one or more virtual ports of the network device. Additionally, the network device includes a virtual port selector to determine, based on the hash value, a particular virtual port, and the network device includes a second network interface to egress the data unit. The second network interface is connected to a particular physical port that is mapped to the particular virtual port by the mapper.

Embodiments of load-balancing network device include a plurality of physical ports, a mapper to map physical ports to virtual ports, and a hash value generator to determine a hash value corresponding to a received data unit. The hash value is based on information included in the received data unit, and the hash value is associated with at least one virtual port of the network device. The network device further includes a virtual port selector to select, based on the hash value, a particular virtual port to which the received data unit is to be forwarded. Additionally, the network device includes a network interface to egress the received data unit, where the network interface is connected to a particular physical port that is mapped to the particular virtual port by the mapper.

DETAILED DESCRIPTION

Figure 1:
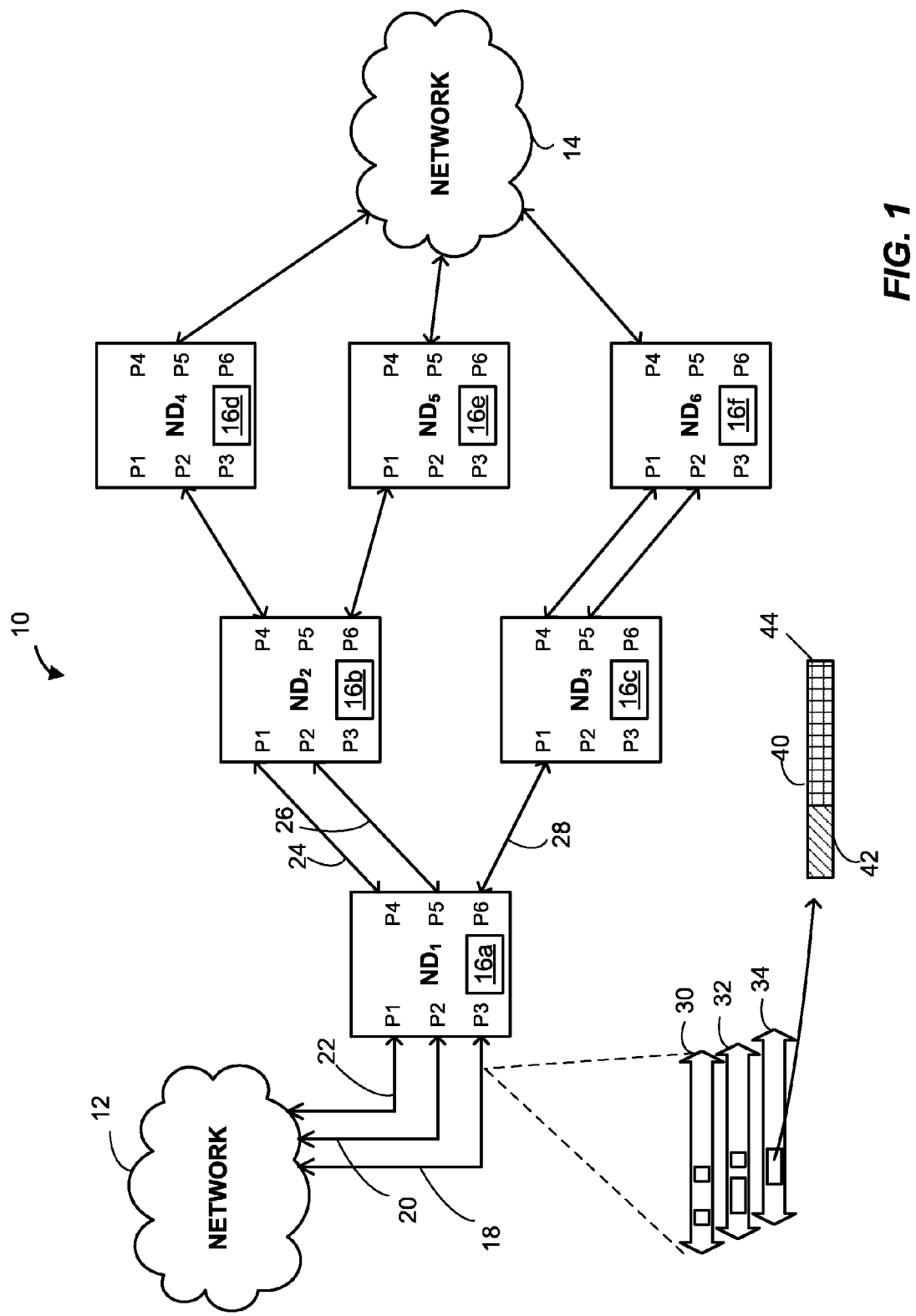
FIG. 1 is a block diagram of a communication network in which network devices apply hash computation techniques discussed herein, according to an embodiment.

FIG. 1 is a block diagram of an example communication network 10 in which several network devices $ND_1$, $ND_2$, ..., $ND_6$ process data flows between an external network 12 and an internal network 14, according to an embodiment. The network 10 utilizes multi-path load-balancing as will be discussed below. The network devices $ND_1$-$ND_6$ may be of the same or different types, and include workgroup switches, other types of switches, routers, or any other suitable devices having data processing capability, in various embodiments. Each of the network devices $ND_1$-$ND_6$ includes a respective hash value generator 16a-16f that implements at least some of the techniques discussed below, in an embodiment.

In operation, the network device $ND_1$ receives data units (such as packets or frames) traveling from the external network 12 to the internal communication network 14 via communication links 18, 20, and 22 at respective ports P1, P2, and P3 (generally referred to herein as "receive ports" or "source ports" $P_R$). The network device $ND_1$ forwards the received data units to the network devices $ND_2$ or $ND_3$ via the corresponding ports P4, P5, and P6 (generally referred to herein as "transmit ports" or "destination ports" $P_T$) and, ultimately, respective communication links 24, 26, and 28. The network device $ND_1$ thus has a receive interface (also referred to as a "receive network interface") to which the communication links 18, 20, and 22 are coupled, and a transmit interface (also referred to as a "transmit network interface") coupled to the communication links 24, 26, and 28. The routing configuration of the load-balancing network 10, in some scenarios, is such that the network device $ND_1$ selects one of the ports of P4, P5, or P6 to properly direct a data packet toward its destination in the internal network 14. However, because each of the communication links 24-28 has limited bandwidth, the network device $ND_1$ applies load-balancing techniques to distribute the received packets among the appropriate ones of the links 24-28. In other words, the network device $ND_1$ selects one of the ports corresponding to an appropriate link. To this end, the network device $ND_1$ utilizes the hash value generator 16a to generate an efficient hash value using parameters specific to the network device $ND_1$, in an embodiment. The hash value is applied to a link selector to select a communication link in a link aggregate group (e.g., links 24, 26, 28) along which the data packet is to travel. Some techniques often produce intra-switch polarization, or "favoring" of a particular link in a group of suitable links for certain types of packets. Further, when multiple network switches operate as respective hops in a load-balancing network, the same load balancing decision may be made at each hop, thus producing inter-switch polarization, or a favoring of a particular path through the load-balancing network. At least some embodiments of the hash value generator 16a avoid link polarization and/or inter-switch polarization and improve the overall distribution balance of data packets among communication links thereby increasing network bandwidth and reducing latency.

Although FIG. 1 illustrates a particular embodiment of the network devices $ND_1$-$ND_6$, each of these the network devices $ND_1$-$ND_6$ includes any suitable number of ports, and at least some of the network devices $ND_1$-$ND_6$ have different numbers of ports. In some embodiments, configurations, and/or scenarios, some or all of the network devices $ND_1$-$ND_6$ perform protocol translation for some of the packets by removing and/or adding protocol headers at one or several protocol layers of a corresponding communication protocol stack.

The links 18-22 correspond to different physical communication channels such as network cables, wireless bands, etc., or logical channels such as timeslots of a digital signal 1 (DS1) line, to take one example, in various embodiments. Similarly, ports P1-P3 correspond to physical or logical resources of the network device $ND_1$, in various embodiments. As illustrated in FIG. 1, the link 18 carries one or more data flows 30-34. Typically but not necessarily, each of the data flows 30-34 is a bidirectional flow including data traveling from the network 12 to the network 14, or inbound data, and data traveling to the network 12 from the network 14, or outbound data. The links 20 and 22 also carry one or several data flows 30-34, in an embodiment. Some of the data flows 30-34 are associated with more than one of the links 18-22, in an embodiment.

In some embodiments and/or scenarios, the data flows 30-34 are associated with different communication protocols such as Transmission Control Protocol (TCP) layered over Internet Protocol (IP) (hereinafter, "TCP/IP"), User Datagram Protocol (UDP) layered over IP (hereinafter, "UDP/IP"), File Transfer Protocol (FTP), Hypertext Transfer Protocol (HTTP), etc. For example, the data flow 30 corresponds to FTP, the data flow 32 corresponds to Telnet, and the data flow 34 corresponds to HTTP, in one scenario. Further, some of the data flows 30-34 correspond to different sessions associated with the same communication protocol, in some scenarios. A typical network link also includes Simple Mail Transfer Protocol (SMTP), Structured Query Language (SQL), and several additional data flows associated with e-mailing, web browsing, database applications, remote login, and other application types. An operator can configure the network devices $ND_1$-$ND_6$ to process and route data flows on other layers of various protocol stacks.

In some scenarios, each of the data flows 30-34 includes multiple streams, sessions, or connections corresponding to various communication protocol layers. It is noted that some protocols, such as TCP, are connection-oriented while others, such as UDP, are connectionless. In one example scenario, an outside host on the network 12 connects to a local host on the network 14 by establishing a TCP connection having a particular address and port combination on both ends. This connection is identifiable by the TCP header specifying, in part, the address of the outside host, the address of the local host, the port on the outside host, and the port on the local host. An individual TCP/IP packet carries a certain quantum or chunk of information associated with the same connection, or communication session. On the other hand, in another example scenario, a pair of hosts uses the UDP protocol to exchange individual messages, or datagrams, without establishing a connection. Thus, in some scenarios, each of the data flows 30-34 includes one or more streams such as TCP streams including multiple packets associated with a single data exchange or single packets conveying individual messages in their entirety. In the examples discussed below, a data stream generally refers to a unidirectional or bidirectional data exchange between two or more hosts including one or more data units such as data packets or frames.

With continued reference to FIG. 1, an example data packet 40 belongs to the TCP/IP flow 34, as an example, and travels in the inbound direction relative to the internal network 14. The data packet 40 includes a header 42 and a payload 44. In general, the header 42 corresponds to one or more layers of the protocol stack and, in some cases, identifies the corresponding packet as belonging to a particular connection-oriented or connectionless data stream. In the examples below, the header 42 refers to all information that precedes the payload on the transport layer, i.e., layer four (L4) in the Open System Interconnection (OSI) seven-layer model. However, if desired, the header 42 includes all headers up to and including the application-layer header or, conversely, includes less than the headers of the layer two (L2), layer 3 (L3), and L4 of the OSI model, in various embodiments.

In general, data packets traveling through the load-balancing network 10 have a suitable desired length consistent with the corresponding protocol (e.g., TCP/IP in the case of the data packet 40). Further, the length of the data packet 40 is operator-configurable to accommodate the particular requirements of the network devices $ND_1$-$ND_6$, in some embodiments. In some embodiments, the network devices $ND_1$-$ND_6$ operate on protocols or protocol layers which do not define packets of a particular length. In this sense, an individual packet is any logical designation of a grouping or quantum of data. In some embodiments, the term "packet" or "data unit" refer simply to a grouping of data on a particular stream for the purpose of generating a hash value by one of the network devices $ND_1$-$ND_6$. On the other hand, in other embodiments, each of these terms refers to a grouping of data included in two or more frames of a communication protocol. For example, a single data packet includes multiple TCP frames in one embodiment.

Figure 2:
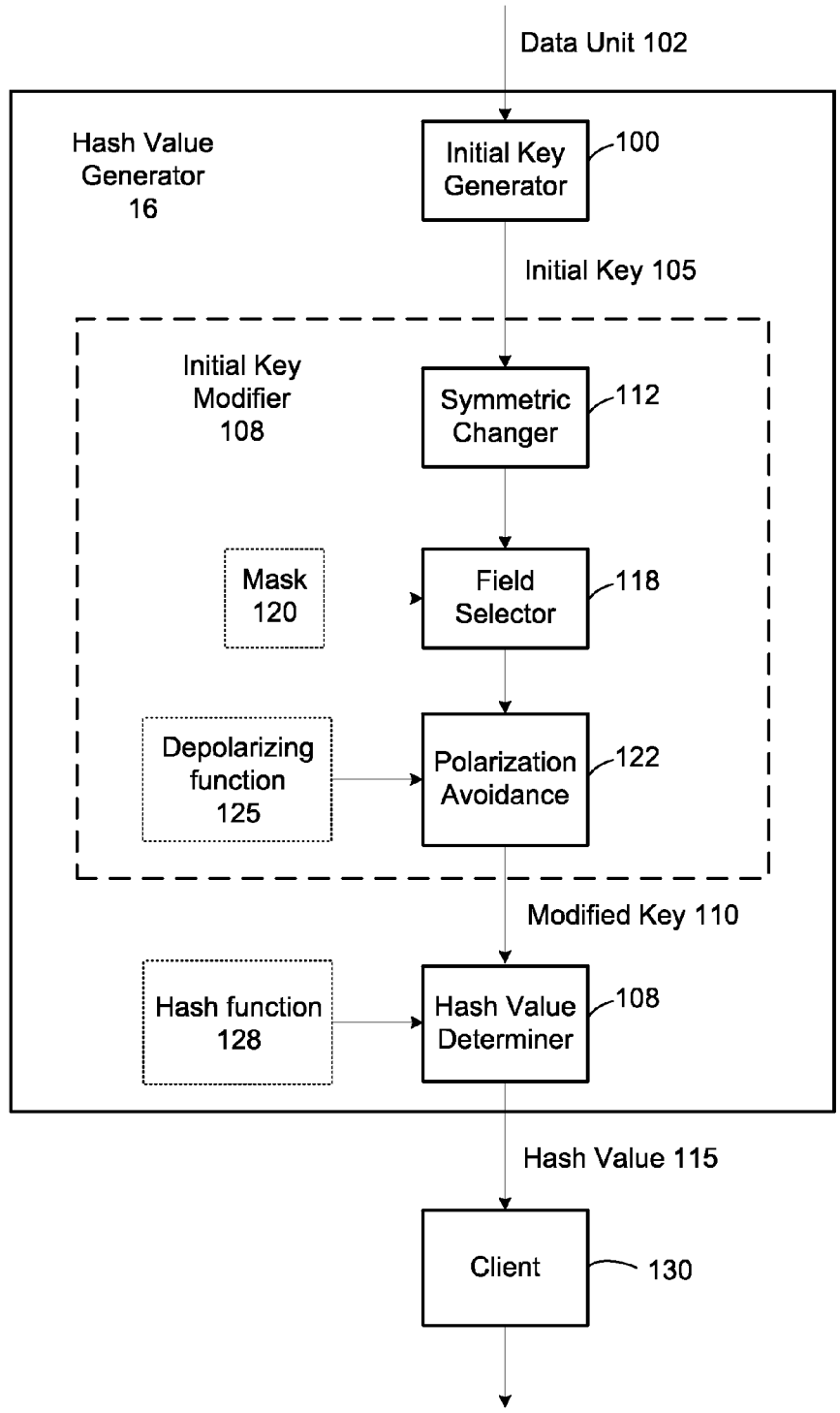
FIG. 2 is a block diagram of an example hash value generator which is implemented in the network devices of FIG. 1, according to an embodiment.

Next, FIG. 2 is a block diagram of an example high-level architecture of each of the hash value generators 16a-16f. For clarity of discussion, the discussion herein refers to generally to a hash value generator "16," although the principles and techniques apply to any of the hash value generators 16a-16f of FIG. 1, or to other suitable hash value generators. Generally, in an embodiment, the architecture of each of the hash value generators 16a-16f is in accordance with the hash value generator 16 of FIG. 2. However, in some embodiments, one or more of the hash value generators 16a-16f differs from other hash value generators in the communication network 10. For example, in an embodiment, a particular hash value generator omits one or more blocks shown in FIG. 2, or one or more parameters utilized by different hash value generators 16a-16f are unique within the network 100. Generally with respect to FIG. 2, some of the components of the hash value generator 16 are implemented using hardware, microcode, software instructions executed by a processor, firmware instructions executed by a processor, or combinations thereof. In an embodiment, the hash value generator 16 is implemented on an application-specific integrated circuit (ASIC) included on a printed circuit board card device having an interface compatible with Peripheral Component Interconnect (PCI) or similar standard.

Referring to FIG. 2, the hash value generator 16 is configured to determine, based on a data unit or packet 102, a key 110 that is used to determine a hash value 115, in an embodiment. The hash value generator 16 configures the key 110 to affect load balancing and/or to decrease polarization both within the network device itself (e.g., "intra-switch" or "intra-device") and within the communication network 10 (e.g., "inter-switch" or "inter-device"), in an embodiment.

In an embodiment, the hash value generator 16 includes an initial key generator 100 that operates on a received data unit or packet 102. During operation, the initial key generator operates on $N_B$ input bytes (or "input data") of the received data unit or packet 102 to generate an initial key 105 of length $N_B$. The initial key 105 includes a string of bytes included in the data unit or packet 102, and, in some embodiments, the initial key 105 includes additional information such as an identification of a source port via which the data unit or packet 102 ingressed into the network device. In some embodiments, a length of the string, e.g., ($N_B$) is equal to 70 bytes of information. In other embodiments, however, other suitable values of $N_B$ are utilized. The initial key 105 includes a source field whose contents correspond to a source from which the data unit or packet 102 was received, and a destination field whose contents correspond to a destination to which the data unit or packet 102 is to be transmitted, in an embodiment. The source and destination fields refer to any suitable source and destination, and have any suitable format, e.g., source and destination IP (Internet Protocol) address fields, source and destination MAC (media access control) address fields, source and destination virtual port identifications, source and destination physical port identifications, etc.

The hash value generator 16 includes an initial key modifier 108, in an embodiment. Generally, the initial key modifier 108 modifies the initial key 105 in a known manner to generate a modified key 110 that enables the hash value generator 16 to generate depolarized and/or load balanced traffic across the communication network 10 and/or across a particular network device $ND_1$-$ND_6$. As such, the modified key 110 may be interchangeably referred to herein as a depolarized initial key. In an embodiment, at each particular network device $ND_1$-$ND_6$, the initial key modifier 108 introduces a consistent modification to the initial key 105, so that teach initial key 105 is consistently modified at a given device $ND_1$-$ND_6$. In this embodiment, each device $ND_1$-$ND_6$ has a different consistent modification introduced by the initial key modifier 108.

In an embodiment, the initial key modifier 108 includes a symmetric key changer 112, also referred to herein as a "symmetric key generator." The symmetric key changer 112 is configured to modify the initial key 105 to produce a modified key 110 so that a common hash value is produced at a particular network device for the particular initial key 105 for both directions of traffic. That is, for a given initial key 105, a packet addressed to travel between network devices $ND_1$ and $ND_5$, a same common hash value is generated whether $ND_1$ is the source of the packet or $ND_1$ is the destination of the packet. Accordingly, in an embodiment where all network devices $ND_1$-$ND_6$ in a communication network 10 each include a symmetric key changer 112, packets of a particular flow (e.g., flows 30-34) travel along a same path throughout the network 100. In an embodiment, all packets of a particular flow travel in both directions along the same path throughout the network 100. In this manner, traffic between network devices $ND_1$-$ND_6$ is load balanced across the communication network 10.

The symmetric key changer or generator 112 modifies two different fields of the initial key 105 based on a commutative function, in an embodiment, to produce a modified key 110 that includes two corresponding symmetric key fields. The symmetric key fields allow a common hash value to be generated irrespective of the order of the two different initial key fields, in an embodiment. In an example embodiment, the two symmetric fields generated from the two initial fields correspond to the expressions:

$$\text{symmetric\_field\_one} = \text{commutative operation(initial\_field\_one, initial\_field\_two)} \quad (1)$$

$$\text{symmetric\_field\_two} = \text{constant or(derivative of symmetric\_field\_one)} \quad (2)$$

The new symmetric fields (e.g., symmetric_field_one and symmetric_field_two) are included in a modified key 110, and the modified key 110 is provided as an input to a hash value determiner 108 to generate a corresponding hash value 115, in an embodiment. Due to the symmetry of the fields of the modified key 110, the resulting hash value 115 generated by the hash value determiner 108 is a common hash value for both directions of traffic of the same flow, e.g., for packets having a same initial key 105. The common hash value is used by the network device to select a link over which the data unit or packet 102 is to be transmitted or forwarded, thus resulting in symmetrical loading throughout the network 10 irrespective of the order of the initial fields.

In an embodiment, the symmetric key changer or generator 112 modifies an initial source field and an initial destination field to produce modified, symmetric_source and destination fields according to the expressions:

$$\text{symmetric\_source\_field} = (\text{initial\_source\_field} + \text{initial\_destination\_field}) \quad (3)$$

$$\text{symmetric\_destination\_field} = 0 \quad (4)$$

In this embodiment, the commutative function is an addition or additive function, although in other embodiments, other commutative functions (e.g., multiplication, etc.) may be used by the symmetric key changer 112. Similarly, in this embodiment, the symmetric_destination_field is set to zero, while in other embodiments, the symmetric_destination_field is set to any suitable constant value, or to a derivative of the symmetric_source_field. In this embodiment, the initial source and destination fields are effectively independent of any particular OSI layer, and as such, the initial source and destination fields may correspond to any suitable addressing or identification scheme, such as IP addresses, MAC addresses, virtual port identifiers, physical port identifiers, etc.

The inclusion of a symmetric key changer or generator 112 in the hash value generator 16 provides for symmetrical latency throughout a communication network 10, and thus increases the predictability of traffic flow for load balancing, in some embodiments. Additionally, the symmetric key changer 112 allows traffic to be intercepted at a network device using a single tap (e.g., a monitoring tap), as well as provides for easier traffic analysis and deep packet inspection, in some embodiments.

In an embodiment, the hash value generator 16 includes a field selector 118. The field selector 118 determines a subset of the bits or bytes of the data unit 102 based on a hash mask 120, in an embodiment. For example, the field selector 118 masks the input bytes that are unselected by the hash mask 120, i.e., zeroes-out the unselected bytes or replaces these bytes with a predefined value to generate a modified key 110. As an illustrative example, the data unit or packet 102 includes, in the first several positions, the bytes 0xA3 0xD4 0x36 0xF3 0x55 . . . (where "0x" denotes hexadecimal representation), the hash mask 120 begins with the bits 11001 . . . , and the field selector 118 accordingly outputs 0xA3 0xD4 0x00 0x00 0x55. In this manner, the mask 120 selectively turns on or off individual bytes in the $N_B$ input bytes of the data unit 102, and thus controls which fields (e.g., fields in the header 42, fields associated with certain parameters of the device (e.g., device $ND_1$, etc.) are used in generating a hash value. In an embodiment, the hash mask 120 is selected based on a type of the packet, e.g., MPLS (Multiprotocol Label Switching), IPv4 (Internet Protocol version 4), IPv6 (Internet Protocol version 6), etc.

In an embodiment, the hash value generator 16 includes a polarization avoidance unit 122 that operates on the initial key 105. The polarization avoidance unit 122 includes a depolarized key generator, in an embodiment, that forms the modified key 110 based on the initial key 105. Generally, for a given network device, the polarization avoidance unit 122 is configured to allow the network device to generate a same, common hash value for all packets of a particular flow (e.g., one of flows 30-34 of FIG. 1). A different hash value is generated for the particular flow at another network device, and still different hash values are generated for different flows at the given device and at other network devices within the communication network 10. In an embodiment, the modified key 110 generated by the polarization avoidance unit 122 causes the hash value determiner 108 to generate a hash value 115 so that inter-switch traffic polarization is avoided. As such, the modified key 110 may be interchangeably referred to herein as a "depolarized initial key" or a "depolarized key." The depolarized key 110 is generated by applying a depolarizing function or depolarizer 125 to the initial key 105 or to selected field of the initial key 105, for example. In an embodiment, the depolarizing function of depolarizer 125 is a common depolarizer for packets or data units having a same set of parameter values (e.g., a same source field and a same destination field).

The depolarizing function or depolarizer 125 is an essentially bijective function, in an embodiment. It is noted that a bijective function is a function $f$ from a set X to a set Y with the property that, for every y in Y, there is exactly one x in X such that $f(x)=y$. For example, the depolarizing function 125 is an exclusive-or (XOR) function, a remapping function, an additive function such as a unique salt or seed, etc. In this embodiment, due to the bijective nature of the depolarization function or depolarizer 125, a different hash value 115 is produced by each network device $ND_1$-$ND_6$ for a given data unit or packet 102. Within the communication network 10, each hash value 115 has a reasonable probability of being essentially or functionally unique. As such, inter-switch or inter-device polarization of network traffic is avoided within the communication network 10, in an embodiment.

Figures 3A, 3B:
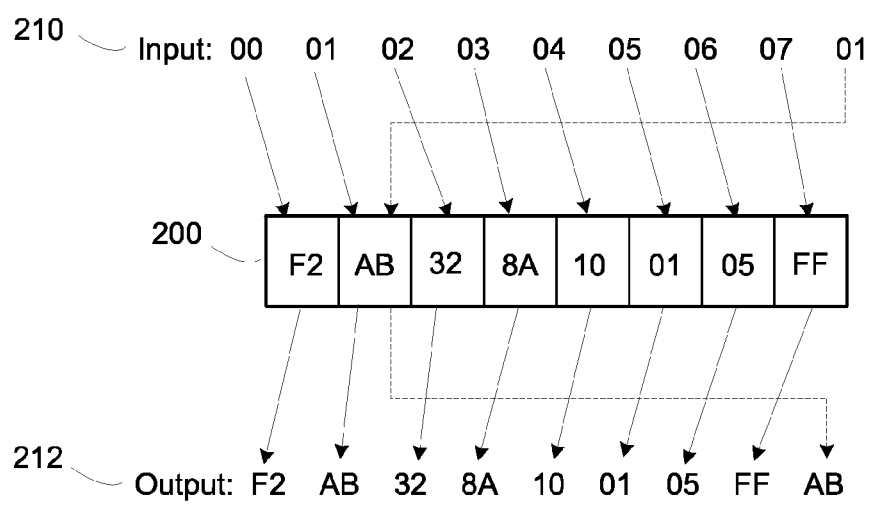
FIGS. 3A and 3B are block diagrams that illustrate an example of a remapping function or table that is included in the hash value generator of FIG. 2, according to an embodiment.

In an embodiment, the depolarization function or depolarizer 125 of the polarization avoidance entity 122 is based on a bijective remapping table or function 200, such as illustrated in FIGS. 3A and 3B. In FIG. 3A, the table or function 200 remaps each byte 202a-202n of the input 202 (e.g., of the initial key 105) to a unique byte 205a-205n of the output 205. In this embodiment, the output 205 of the remapping table or function 200 is a permutation of the input 202 and includes all values of the input 202. As the table 200 is bijective, a one-to-one mapping exists between input values 202 and output values 205. The one-to-one mapping is randomly or pseudo-randomly generated, in an embodiment. An illustration of a remapping of an example input bit stream 210 to an example output bit stream 212 based on the table 200 is illustrated in FIG. 3B.

In another embodiment, the depolarization function or depolarizer 125 is a salt or seed that is combined with the initial key 105. In this embodiment, the salt or seed is a series of bits that is unique, within the communication network 10, to a particular network device. That is, each network device $ND_1$-$ND_6$ within the communication network 10 includes a respective unique salt or seed used by its respective hash value generator 16a-16f. In some embodiments, each salt in the network 10 is randomly generated or pseudo-randomly generated. In some embodiments, the salt or seed is user-configurable. The salt or seed may be any number of bits, and may be combined with the initial key 105 in any manner, such as by appending the salt to the initial key 105, by pre-pending the salt to the initial key 105, or by interleaving bits or bytes of the salt within bits or bytes of the initial key 105. In some embodiments, combining the salt with the initial key 105 is an essentially bijective function, e.g., the combination of the salt and the initial key 105 is bijective for all bits except for a subset of bits, such as the last bits.

In an embodiment, a salt includes a same number of bytes as the initial key 105, and the salt is byte-wise added to the initial key 105 to form a depolarized key 110 according to the expression:

$$\text{depolarized\_key}[i]=\text{initial\_key}[i]+\text{salt}[i] \qquad (5)$$

where i denotes a particular byte. In this embodiment, as each network device $ND_1$-$ND_6$ within the communication network 10 includes a unique salt or seed, each network device $ND_1$-$ND_6$ generates a different depolarized key for packets having a same initial key 105. Consequently, as the different depolarized keys are used to determine transmit ports or communication links at each network device $ND_1$-$ND_6$, different transmit ports or communications links are selected across the network for packets having a same initial key 105, resulting in the depolarization of network traffic.

Turning back to FIG. 2, in the illustrated embodiment, the initial key modifier 108 includes a symmetric changer 112 whose output is masked by a field selector 118, whose output is then depolarized by the polarization avoidance unit 122, resulting in the modified key 110 that is input to the hash value determiner 108. However, in other embodiments of the hash value generator 16, one or more of the entities 112, 118 and 122 is omitted. Additionally or alternatively, the order of operation of entities 112, 118 and 122 as applied to the initial key 105 is different than as illustrated in FIG. 2, in some embodiments. In one example, the modified key 110 is generated by modifying the initial key 105 with only the symmetric changer 112; in another example, the modified key 110 is generated by modifying the initial key 105 by both the field selector 118 and the polarization avoidance entity 122; and in yet another example, the initial key 105 is modified only by the polarization avoidance unit 122. To optimize load balancing and depolarization within the communication network 10, though, the hash value generator $16a$-$16f$ of each network device $ND_1$-$ND_6$ of the communication network 10 includes the same entity or the same set of entities selected from entities 112, 118 and 122, although such uniformity is not necessary.

The hash value determiner 108 operates on the modified key 110 and generates a hash value 115 based on a hash function 128, in an embodiment. In an embodiment, the hash function 128 applied to the modified key 110 is a same, common hash function 128 at each device $ND_1$-$ND_6$. Typically, the hash value 115 generated by the hash function 128 is shorter in length than the length of the modified key 115. The hash value is provided to a client 130 for use in processing or forwarding data units or packets, in an embodiment. The client 130 is included on the network device, in an embodiment, and the client 130 may be included on a same solid state device or a different solid state device as the hash value generator 16. Examples of types of clients 130 of the hash value 115 include, for example, routers, trunks, trunk members, layer 2 ECMP, egress tables, ingress tables, TCAMs (ternary content addressable memories), and the like.

In an embodiment, as previously discussed, the hash value 115 is used by the client 130 to select a communication link over which to transmit the data unit 102. As such, the hash value 115 is configured to effect the selection of communication links to balance traffic loads and to avoid polarization within the network 10, in some embodiments. In an embodiment, the hash function 128 is configured to generate a hash value 115 that is sufficiently long enough to avoid overlap among fields so as to provide a uniform distribution of traffic or a desired level of sufficient uniformity of traffic distribution across communication links, thereby avoiding network device polarization. In an embodiment, the hash function 128 includes a cyclic redundancy check (CRC) generator, such as a CRC32 generator that outputs a hash value 115 having a length of 32 bits.

Figure 4:
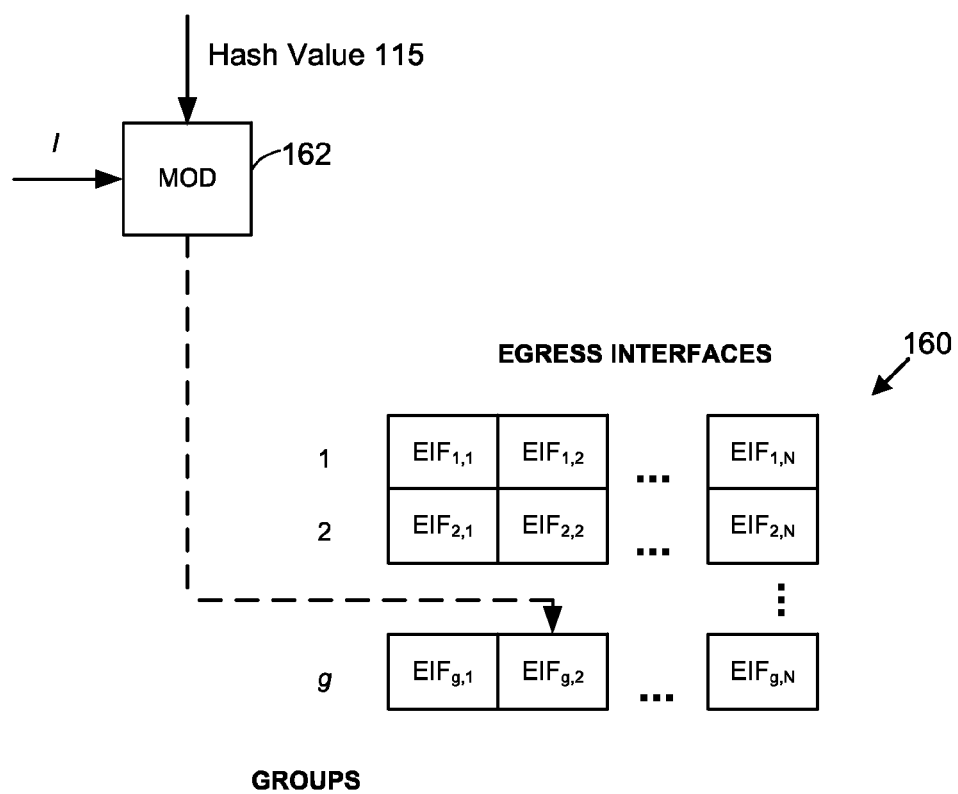
FIG. 4 is block diagram that illustrates an example application of a hash value generated by the hash value generator of FIG. 2, according to an embodiment.

As schematically illustrated in FIG. 4, the client 130 is an egress interface table 160 and the hash value 115 generated by the hash value generator 16 is used as an index into the egress interface table 160, in an embodiment. Referring again to FIG. 1, the network device $ND_1$ determines, based on the header 42, the ingress port at which the data packet 40 is received, or using any other suitable information, that the data packet 40 belongs to a link aggregate group g having l members (i.e., links). Referring again to FIG. 4, a selector 162 of the network device $ND_1$, applies a function to the hash value 115 to generate an index into the table 160. In an embodiment, the function applied to the hash value 115 is:

$$\text{index} = (\text{hash value}) * l / (2^n), \quad (6)$$

although other suitable functions may be applied to the hash value 115. The network device $ND_1$ then uses the generated index to select an entry in the egress interface table 160 at row g which specifies a link on which the data packet 40 is to be propagated, in an embodiment.

In other embodiments, an entry of the egress interface table 160 specifies a particular virtual destination port. In these embodiments, the network device $ND_1$ determines that the data packet 40 is to be forwarded to a group of virtual ports having v members, and the selector 162 applies a function to the hash index 115 based on the number of virtual ports v to generate an index into the table 160. The network device $ND_1$ then uses the generated index to select an entry in the egress table 160 at row v which specifies a virtual destination port for the data packet 40. The virtual ports are then mapped to one or more physical ports, and the data packet 40 is egressed via the one or more physical ports. Virtual port techniques are discussed in more detail below.

While the egress interface table 160 is one example of a client of the hash value 115, the network device $ND_1$ includes one or more other clients of the hash value 115, in some embodiments. A "client" of the hash value 115, as referred to herein, is an entity or function within a network device (e.g., network device $ND_1$) that uses the hash value 115 to perform one or more functions to process, forward, or analyze the data unit or packet. For example, as discussed above, the egress interface table 160 uses the hash value 115 to determine an index to select a link. Other clients of the hash value 115 include a DRAM member selector, a router engine, a layer two Equal Cost Multipath (ECMP) determiner, a trunk, a trunk member, or some other entity included in the network device $ND_1$, in various embodiments. Generally, the hash function 128 is configured to generate a hash value 115 that has a length that is long enough to service all clients of the hash value 115 within the network device.

Figure 5:
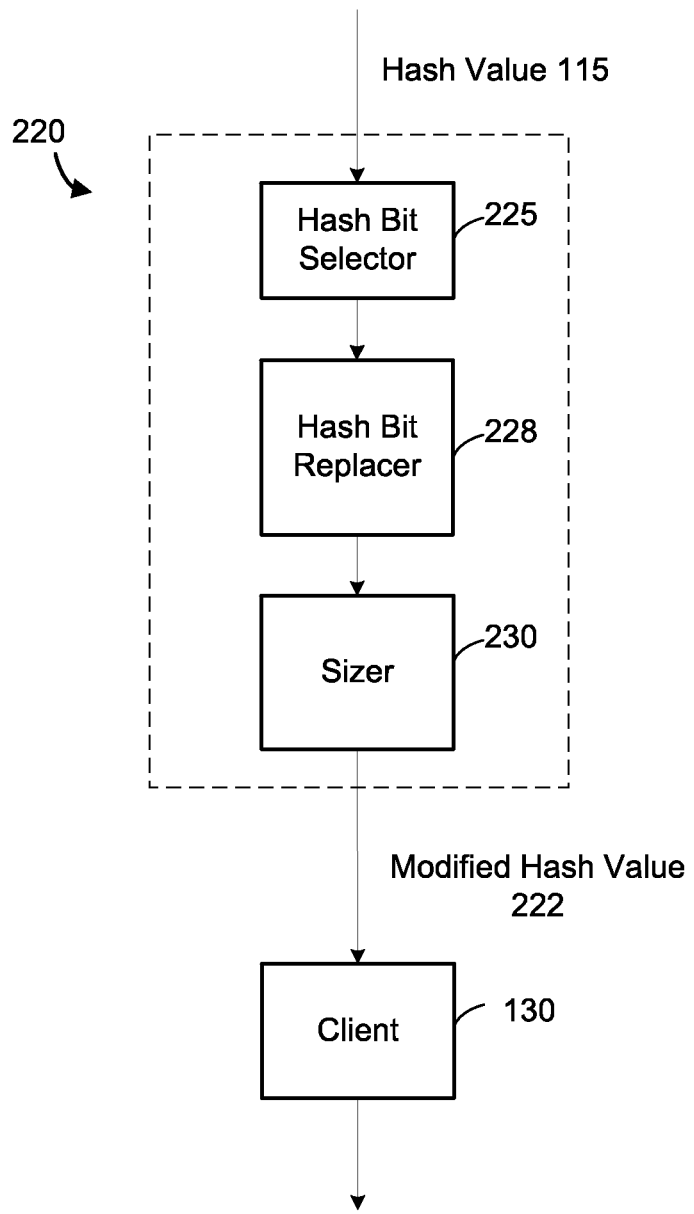
FIG. 5 is a block diagram of an example hash value modifier which is implemented in the network devices of FIG. 1, according to an embodiment.

In some embodiments, the hash value 115 is modified to affect load balancing and/or depolarization of traffic (e.g., "intra-switch" load balancing and/or "intra-switch" depolarization). FIG. 5 depicts a hash value modifier 220 that is configured to determine, based on a hash value 115, a modified hash value 222 that is utilized by the client 130 of FIG. 2. The hash value modifier 220 generates a modified hash value 222 to affect intra-switch load balancing and/or intra-switch depolarization, in an embodiment. Generally with respect to FIG. 5, some of the components of the hash value modifier 220 are implemented using hardware, microcode, software instructions executed by a processor, firmware instructions executed by a processor, or combinations thereof. In an embodiment, the hash value modifier 220 is implemented in an Application Specific Integrated Circuit (ASIC) included on a printed circuit board. The hash value modifier 220 and the hash value generator 16 are included in a same ASIC or solid state device configured as a packet processor, in an embodiment, and in another embodiment, the hash value modifier 220 and the hash value generator 16 are included in different ASICs or solid state devices.

Referring to FIG. 5, the hash value modifier 220 includes a hash bit selector 225. The hash bit selector 225 is configured to select, based on an identity or a type of the client 130, a subset of bits of the hash value 115 to be included in the modified hash value 222, in an embodiment. In an example embodiment, different, mutually exclusive subsets of bits are selected by the hash bit selector 220 for different clients or different types of clients included in a network device (e.g., $ND_1$) so that different modified keys are provided to different clients, even though each of the different modified keys is based on a common, original hash value 115. In some embodiments, a client 130 pads its respective subset of bits by pre-pending, appending or interleaving a desired number of zeros, a desired number of ones, or a predetermined combination of ones and zeros. With the hash bit selector 220, as different clients of the hash value 115 use their respective modified keys to select an output port or communication link, traffic is distributed across the link aggregate group (and, therefore, output ports corresponding thereto) for all clients of the hash value 115, thereby realizing intra-switch load balancing and intra-switch depolarization.

In some embodiments, the hash value modifier 220 includes a hash bit replacer 228. The hash bit replacer 228 is typically included in scenarios where the modified hash value 222 is required, based on an identity or type of client 130, to be relatively short in length so that stringent load balancing requirements are met. In these scenarios, the hash bit replacer 228 replaces the hash value 115 with a randomly or pseudo-randomly generated number, an incremental index, a number selected in a round-robin manner, or a number that is based on some other information. For example, the hash bit replacer 228 replaces the hash value 115 with a number selected in a round-robin manner to generate a modified hash value 222 for providing packet-based load balancing. In another example, the hash bit replacer 228 replaces the hash value 115 with a randomly or pseudo-randomly generated number to generate a modified hash value 222 for providing a uniform distribution. In yet another example, the hash bit replacer 228 replaces the hash value 115 with an indication of a link that is transporting a least amount of data traffic to generate a modified hash value 222 for providing a near-perfect distribution of bytes. It is noted that by using the hash bit replacer 228 to modify the hash value 115, in some embodiments, data units or packets arrive at their destination out of order, so a trade-off between stringent load balancing and maintenance of packet order occurs.

In some embodiments, the hash value modifier 220 includes a sizer 230. To generate an index in a desired range or of a desired size, the sizer 230 is configured to modify the hash value 115 by adjusting its length to form a modified hash value 222 for use by the client 130. In an embodiment, the sizer 230 adjusts the size or length of the hash value 115 based on a size of the hash value 222 required by the client 130. For example, if the client 130 is the egress interface table 160 of FIG. 4, the sizer 115 adjusts the length of the hash value 115 based on a total number of communication links included in the link aggregate group corresponding to the network device (e.g., $ND_1$) to form the modified hash value 222. Consider an example where the hash value 115 has a length of n bits and the client 130 requires a modified hash value between Z to y (inclusive, where Z is normally, but not necessarily, zero), where the range of modified hash values corresponds to a range corresponding to a total number of communication links. In this example, the sizer 230 maps each of the possible $2^n$ values of the hash value 115 to modified hash values between Z and y, inclusive. For example, the sizer 230 may map values of the hash value 115 according to the function $$f(x)=x\ \mathrm{modulo}(y+1) \qquad (7)$$

or according to the function $$g(x)=x*(y+1)^n+Z. \qquad (8)$$

In other situations, other suitable functions may be used by the sizer 230.

A traffic imbalance may occur when the ranges of modified hash values and the number of links are different. To address possible traffic imbalances, the hash function 128 of the hash value generator 16 is configured to generate a hash value 115 to affect a more uniform distribution and to correct possible imbalances between ranges of modified hash values and numbers of links, in an embodiment. For example, the hash function 128 is configured to generate a hash value 115 that has a length long enough to provide a desired level of data unit traffic distribution across the number of links. The sizer 230 may then be used to reduce the overall length of the hash value 115 to a length required by the client 130 (e.g., the sizer generates a modified hash value 222 that is shorter than the hash value 115.)

In the embodiment of FIG. 5, the hash value modifier 220 includes a hash bit selector 225, whose output is operated on by a hash bit replacer 228, whose output is then, in turn, operated on by the sizer 230, resulting in the modified hash value 222 that is provided to the client 130. However, in other embodiments of the hash value modifier 220, one or more of the entities 225, 228, 230 are omitted. Additionally or alternatively, in some embodiments, the order of operation of entities 225, 228, and/or 230 on the hash value 115 is different than the embodiment illustrated in FIG. 5. For example, the modified hash value 222 is generated by modifying the hash value 115 only by using the hash bit replacer 228, in an embodiment; in another embodiment, the modified hash value 222 is generated by modifying the hash value 115 with both the hash bit selector 225 and the sizer 230; and in yet another embodiment, the initial key 105 is modified only by the hash bit selector 225 or only by the sizer 230.

Figure 6:
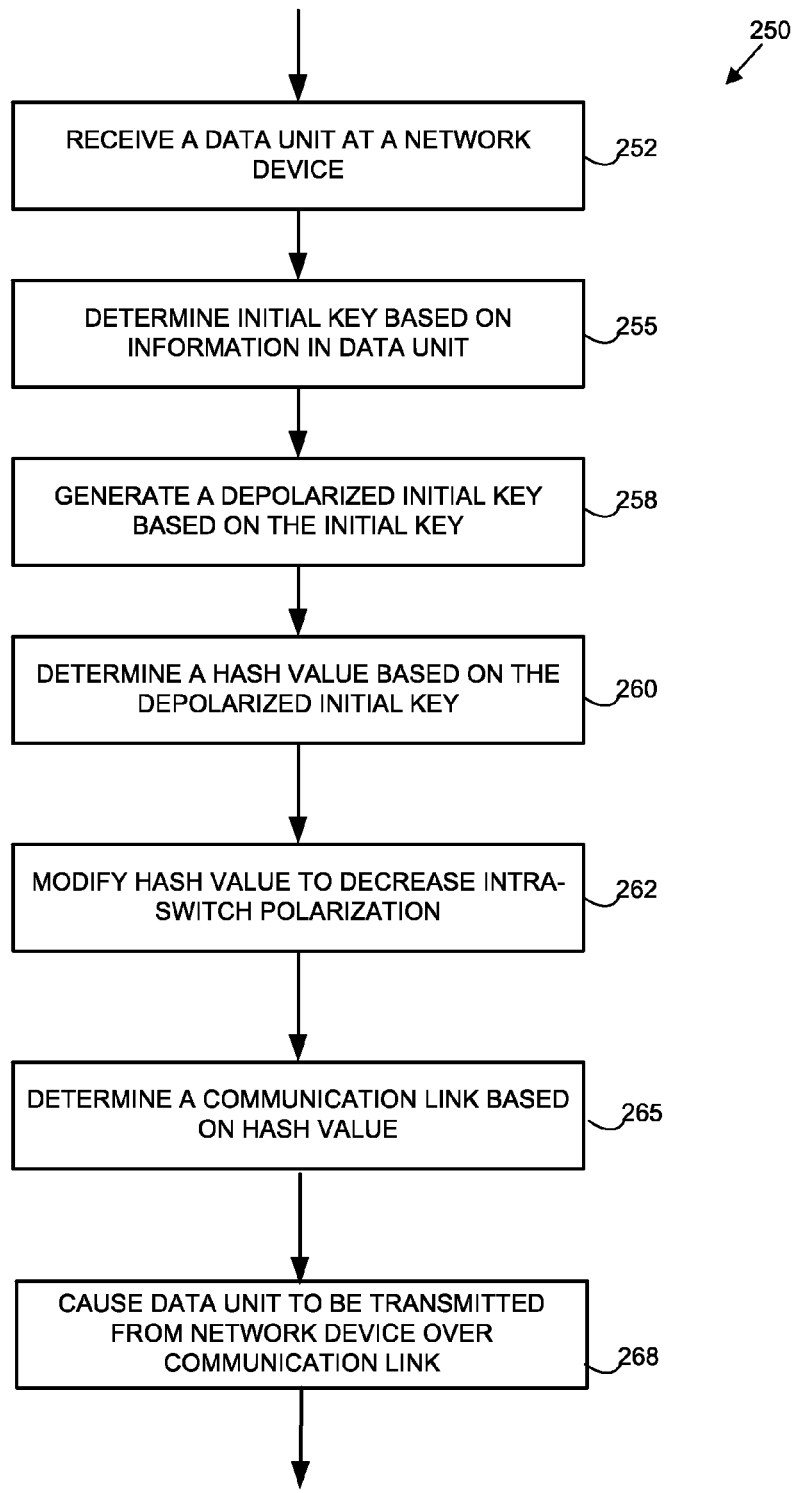
FIG. 6 is a flow diagram of an example method for avoiding polarization in a communication network that is implemented by one or several network devices of FIG. 1, according to an embodiment.

FIG. 6 is a flow diagram of an example method 250 for avoiding polarization in a communication network 10, according to an embodiment. The method 250 is implemented by the hash value generator 16 alone (see FIG. 2), or by the hash value generator 16 in cooperation with other components of the corresponding network device $ND_1$-$ND_6$ (see FIG. 1), in some embodiments. The method 250 operates in conjunction with the hash value modifier 220 of FIG. 5, in an embodiment.

At block 252, a data unit such as the data packet 40 is received at a certain port $P_R$ of the network device implementing the method 250 (e.g., the network device $ND_1$). Next, at block 255, an initial key is determined based on information included in the received packet or data unit. The initial key includes, in an embodiment, an indication of a source and of a destination of the data unit or packet.

At block 258, a modified key is generated from the initial key, in an embodiment. In an embodiment, the modified key is a depolarized initial key, where the depolarized initial key is configured so that polarization of network traffic within the network 10 when the depolarized initial key is utilized is less than inter-switch polarization when the initial key is utilized. Generating the depolarized initial key based on the initial key (block 258) includes applying a bijective or an essentially bijective function to the initial key, in some embodiments. The bijective or essentially bijective function is, for example, an addition or additive function, a remapping function, an exclusive-or (XOR) function, or any suitable bijective function, in various embodiments. In an embodiment, applying the bijective or essentially bijective function to the initial key includes adding bytes of a salt or seed to respective bytes of the initial key, in a byte-by-byte manner. The salt or seed is a randomly or pseudo-randomly generated sequence of bits, in an embodiment, and in some embodiments, a length of the randomly or pseudo-randomly generated sequence of bits is equivalent to a length of the initial key.

In an embodiment, each network device $ND_1$-$ND_6$ included in the communications network 10 includes a different salt or seed that is unique within the communication network 10. As such, a different depolarized initial key is generated (block 258) at each different network device included in the communication network 10. For example, for a same packet, a first depolarized initial key is generated at a first network device $ND_1$, and a different, second depolarized initial key is generated at a second network device $ND_2$.

At block 260, a hash value corresponding to the data unit or packet is determined based on the depolarized initial key, in an embodiment. For example, a hash function such as the hash function 128 operates on the depolarized initial key to produce a hash value. In an embodiment, each network device $ND_1$-$ND_6$ of the communication network 10 includes the same, common hash function.

At an optional block 262, the hash value determined at the block 260 (e.g., the original hash value) is further modified to avoid or decrease intra-switch polarization or polarization within the network device, in an embodiment. For example, the original hash value is modified to generate a modified hash value by selecting a subset of bits of the hash value. The subset of selected bits is determined based on a type or identity of a client of the hash value, in an embodiment. For instance, an egress table client requires only eight bytes of a 70 byte long modified key, so eight bits of the hash value are selected to form a modified hash value. In an embodiment, mutually exclusive subsets of bits or bytes are mapped to respective clients or respective types of clients of the hash value. In an embodiment, block 262 is omitted.

At block 265, a communication link via which the data unit or packet is to be egressed or transmitted from the network device is determined. In an embodiment, the communication link is determined based on a hash value determined at the block 260 (or based on a modified hash value determined at the block 262, if optional block 262 is included). In an embodiment, a client of the (modified) hash value performs one or more functions, based on the (modified) hash value, that are executed within the network device to forward the data unit or packet. For example, if the client is an egress interface table such as the egress interface table 160, the egress interface table 160 utilizes the (modified) hash value as an index to determine a particular virtual port, physical port or communication link via which the packet is to be transmitted. The particular communication link or port is or corresponds to one of a plurality of communication links that are included in a link aggregate group corresponding to the network device, in an embodiment.

At block 268, the packet is caused to be transmitted from the network device. In an embodiment, a data unit such as the data packet 40 is transmitted via a certain port $P_T$ of the network device implementing the method 250 (e.g., the network device $ND_1$), for example, over the particular communication link determined at block 265.

Figure 7:
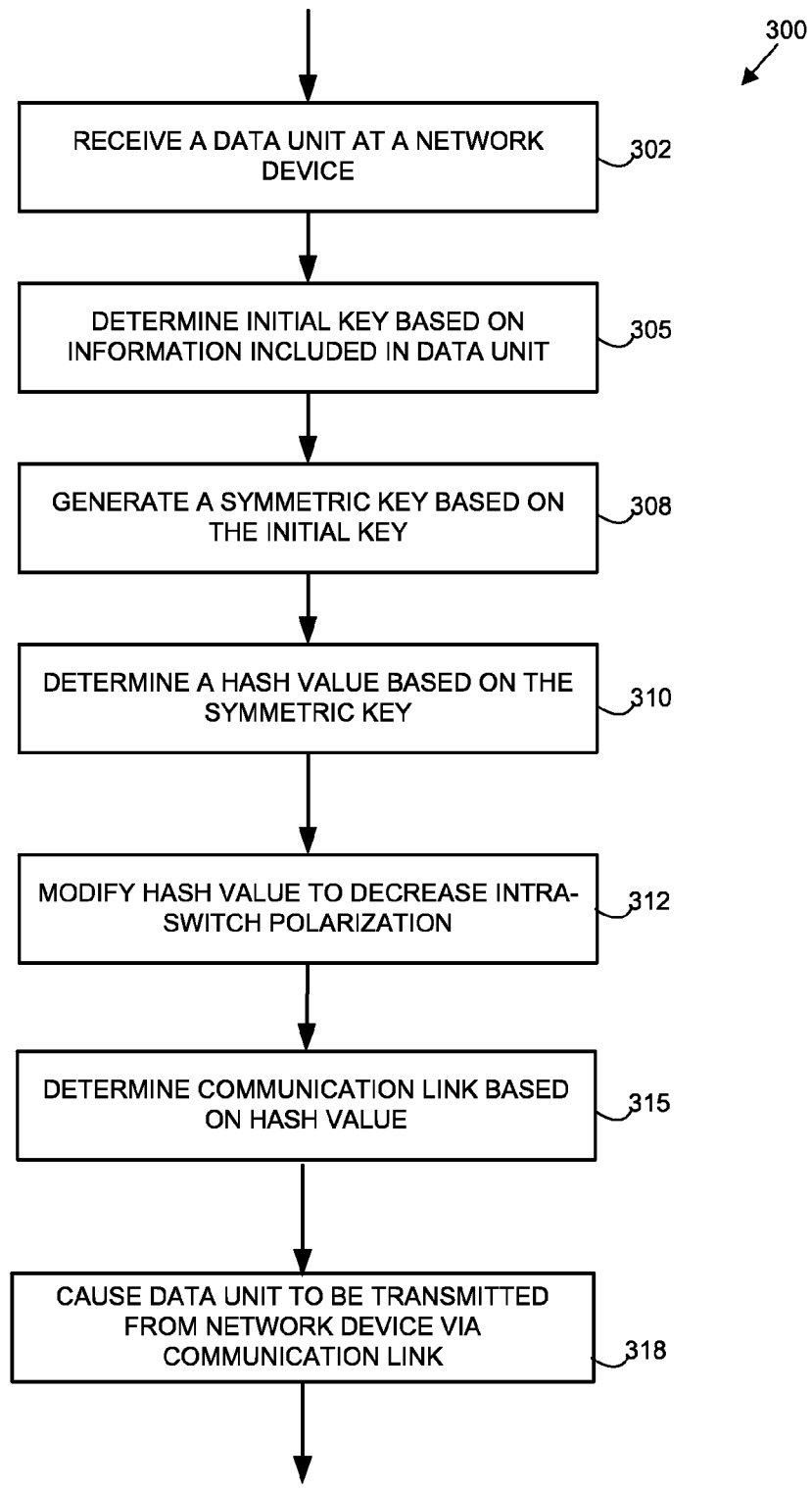
FIG. 7 is a flow diagram of an example method for load balancing traffic in a communication network that is implemented by one or several network devices of FIG. 1, according to an embodiment.

FIG. 7 is a flow diagram of an example method 300 for load balancing traffic in a communication network 10, according to an embodiment. The method 300 is implemented by the hash value generator 16 alone (see FIG. 2), or by the hash value generator 16 in cooperation with other components of the corresponding network device $ND_1$-$ND_6$ (see FIG. 1), in some embodiments. The method 300 operates in conjunction with the hash value modifier 220 of FIG. 5 and/or in conjunction with the method 250 of FIG. 6, in an embodiment.

At block 302, a data unit such as the data packet 40 is received at a certain port $P_R$ of the network device implementing the method 300 (e.g., the network device $ND_1$). Next, at block 305, an initial key is determined based on information included in the received packet or data unit. The initial key includes, in an embodiment, an indication of a source and of a destination of the data unit or packet.

At block 308, a modified key is generated from the initial key, in an embodiment. In an embodiment, the modified key is a load balancing key, where the load balancing key is configured so that traffic within the network 10 is more load balanced when the load balancing key is utilized as compared to when the initial key is utilized. Generating the load balancing key 308 includes, in an embodiment, generating a symmetric key based on two fields of the initial key. In an embodiment, the two fields of the initial key correspond to an indication of the source of the packet and an indication of the destination of the packet. For example, the two fields of the initial key may correspond to an IP source address and an IP destination address, a MAC source address and a MAC destination address, a virtual source port identifier and a virtual destination port identifier, a physical source port identifier and a physical destination port identifier, etc.

A commutative function is applied to one of the two fields, and the result of the commutative function is populated into the respective field of the symmetric key, in an embodiment. The other field of the symmetric key is populated with a constant (e.g., zero or some other suitable constant) or with a derivative of the result of the commutative function (e.g., a derivative of the content of the first field of the symmetric key), in an embodiment. The commutative function is any suitable commutative function, such as an addition function, a multiplication function, or the like.

Based on the load balancing key, a common hash value is determined at block 310 irrespective of the ordering of the two field of the initial key, in an embodiment. That is, a common hash value is determined irrespective of the direction in which a packet is traveling. In some cases, a hash function such as the hash function 128 operates on the load balancing key to produce the common hash value. In an embodiment, each network device $ND_1$-$ND_6$ of the communication network 10 includes the same, common hash function.

At an optional block 312, the hash value determined at the block 310 (e.g., the original, common hash value) is further modified to generate a modified hash value that, in turn, effects intra-switch load balancing or load balancing within the network device itself. In an embodiment, the original hash value is re-sized to a different length based on the requirements of a client of the hash value. For example, if the client is the egress interface table 160 of FIG. 4, the length of the original hash value is adjusted based on a total number of communication links included in the link aggregate group corresponding to the network device (e.g., $ND_1$) to form a modified hash value that is sized. In an embodiment, if the original hash value generated at the block 310 has a length of n bits, and the client requires a load balancing hash value between Z to y, each of the possible $2^n$ values of the original hash value is mapped to a load balancing hash value between Z and y. For example, an original hash value x generated at the block 310 is transformed into a sized, modified hash value at the block 312 according to the function $$f(x) = x \; \text{modulo}(y+1) \tag{9}$$

according to the function $$g(x) = x^*(y+1)^n + Z \tag{10}$$

or according to another suitable function. Typically, but not necessarily, the length of the sized, modified hash value generated at the block 312 is less than a length of the original hash value generated at the block 310. In some embodiments, block 312 is omitted.

At block 315, a communication link over which the data unit or packet is to be transmitted from the network device is determined. In an embodiment, the communication link is determined based on the original hash value determined at the block 310 (or based on the modified hash value determined at the block 312, if optional block 312 is included). In an embodiment, a client of the (modified) hash value performs one or more functions, based on the (modified) hash value, that are executed within the network device to forward or analyze the data unit or packet. For example, if the client is an egress interface table such as the egress interface table 160, the egress interface table 160 utilizes the (modified) hash value as an index to determine a particular communication link or port (e.g., virtual or physical port) via which the packet is to be transmitted. The particular communication link may be one of a plurality of communication links that are included in a link aggregate group corresponding to the network device, in an embodiment.

At block 318, the data unit or packet is caused to be egressed or transmitted from the network device. In an embodiment, a data unit such as the data packet 40 is transmitted via a certain port $P_T$ of the network device implementing the method 300 (e.g., the network device $ND_1$). For example, the packet is transmitted from a network interface of the network device over the particular communication link determined at the block 315.

Techniques described herein are utilized in a network device that utilizes virtual port techniques, in an embodiment. An example of a network device utilizing virtual port techniques is disclosed in U.S. patent application Ser. No. 12/030,822, entitled "Logical Bridging System and Method," filed on Feb. 13, 2008, now U.S. Pat. No. 7,796,594, the entire disclosure of which is hereby expressly incorporated by reference herein. Another example of a network device utilizing virtual port techniques is disclosed in U.S. patent application Ser. No. 12/938,116, entitled "Switching Apparatus and Method Based on Virtual Interfaces," and filed on Nov. 2, 2010, the entire disclosure of which is hereby expressly incorporated by reference herein. With virtual port techniques, a network device typically utilizes a different number of virtual ports than a number of physical ports, and the network device is configured to perform a mapping between virtual ports and physical ports. For example, in one example network device utilizing virtual port techniques, indications of the physical ports via which packets ingress the network device are mapped to virtual ports. A packet processor is configured to process packets with respect to virtual ports. For example, the packet processor determines one or more virtual ports to which a packet is to be forwarded. The determined one or more virtual ports are mapped to one or more physical ports, and the packet is transmitted via the determined one or more physical ports.

Figure 8:
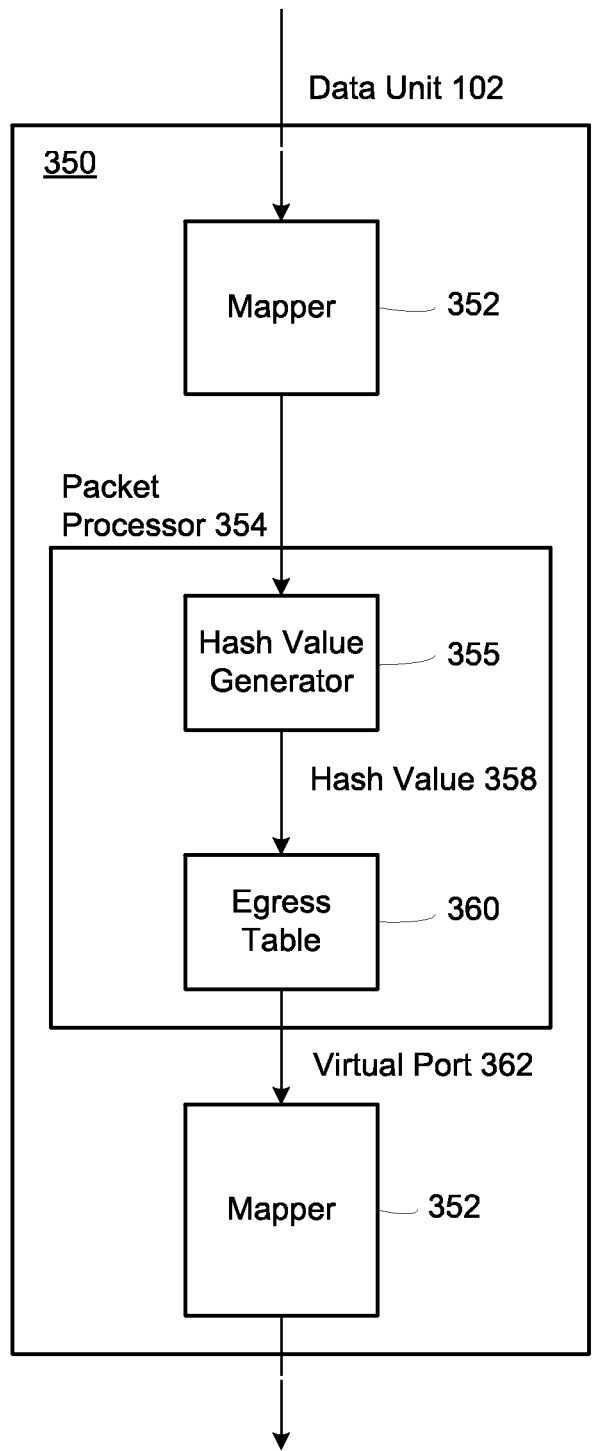
FIG. 8 includes a block diagram of an example network switch or device having virtual ports and configured to load-balance across a set of virtual ports of the network device.

FIG. 8 is a block diagram of an example network device 350 that utilizes virtual ports and that implements at least some of the load balancing techniques described herein, according to an embodiment. The network device 350 is included in the communication network 10 of FIG. 1, in an embodiment. For example, one or more of network devices $ND_1$-$ND_6$ of FIG. 1 includes the network device 350 of FIG. 8, in an embodiment.

The network device 350 includes a mapper 352 configured to map physical ports to virtual ports, and vice versa. For example, the mapper 352 maps a physical port via which a data unit 102 is received to a virtual port.

A packet processor 354 processes packets with respect to virtual ports. For example, the packet processor 354 may determine one or more virtual ports to which a packet is to be forwarded. The packet processor 354 includes a hash value generator 355. In an embodiment, the hash value generator 355 is an embodiment of the hash value generator 16 of FIG. 2. The hash value generator 355 operates on the data unit 102, and generates a hash value 358, in an embodiment. For example, the hash value 358 is an embodiment of the hash value 115 of FIG. 2. In an embodiment and in some scenarios, the hash value 115 is generated based on an indication of a virtual source port corresponding to a physical port via which the data unit 102 was received.

The generated hash value 358 is utilized with respect to lookups in an egress table 360, in an embodiment. For example, the egress table 360 is an embodiment of the client 130 of FIG. 2 or the egress table 160 of FIG. 4. The egress table 360 includes entries storing indications of virtual destination ports, in an embodiment, and the hash value 358 is used to determine a particular entry of the egress table 360 to identify a particular virtual port 362 to which the data unit 102 is to be forwarded. For example, the hash value 358 is used to determine an index into the egress table 360 to determine the particular virtual port, in a manner similar to that as previously discussed with respect to FIG. 4.

An indication of the particular virtual destination port 362 determined based on the egress table 360 is provided to the mapper 352, in an embodiment. The mapper 352 maps the virtual destination port 362 to a corresponding physical destination port, in an embodiment. The network device 350 causes the data unit or packet to be transmitted from the network device 350 via the corresponding physical destination port, in an embodiment. As such, a load of traffic across a set of virtual and/or physical destination ports is more uniformly balanced in the network device 350, in an embodiment.

Figure 9:
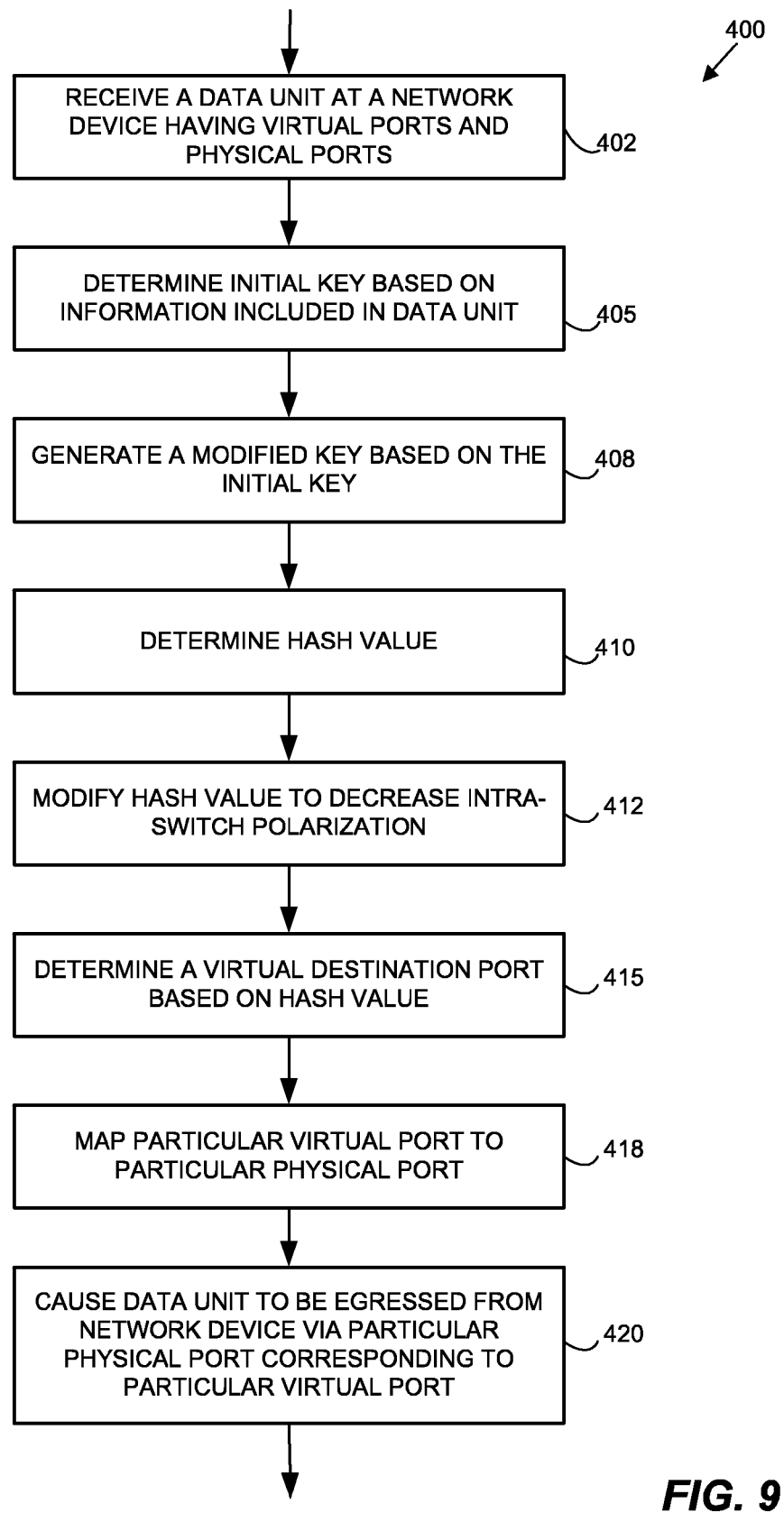
FIG. 9 is a flow diagram of an example method for load balancing traffic in a network device that is implemented by one or several network devices of FIG. 1 or of FIG. 8, according to an embodiment.

FIG. 9 is a flow diagram of an example method 400 for load balancing traffic in a network device, according to an embodiment. In an embodiment, the method 400 is implemented by the network device 350 of FIG. 8. The method 400 operates in conjunction with the hash value generator 16 of FIG. 2, the hash value modifier 220 of FIG. 5, the method 250 of FIG. 6, and/or the method 300 of FIG. 7, in some embodiments.

At block 402, a data unit such as the data packet 40 is received at a certain port $P_R$ of the network device having virtual ports (e.g., the network device 350 or another suitable network device). For example, the certain port $P_R$ is a physical port, and the physical port is then mapped to a corresponding virtual port, according to an embodiment. Next, at block 405, an initial key is determined based on information included in the packet or data unit. In some embodiments and/or scenarios, the initial key is determined based on an indication of a virtual source port corresponding to the certain physical port $P_R$ via which the data unit was received.

At block 408, a modified key is generated from the initial key. In an embodiment, the modified key is generated such that the modified key is depolarized (such as previously described with respect to FIG. 6), and/or such that the modified key is symmetric (such as previously described with respect to FIG. 7).

At block 410, a hash value is determined based on the modified key. For example, the hash value is generated based on applying a hash function such as the hash function 128 to the modified key, in an embodiment. In an embodiment, each network device $ND_1$-$ND_6$ of the communication network 10 applies the same, common hash function.

At block 412, the hash value determined at the block 410 is further modified to generate a modified hash value that, in turn, affects intra-switch load balancing or load balancing within the network device itself. In an embodiment, the original hash value is re-sized to a different length based on requirements of a client of the hash value. For example, the hash value is re-sized based on the egress table 360. In some embodiments, block 412 is omitted.

At block 415, a virtual destination port corresponding to the data unit or packet is determined. In an embodiment, the virtual destination port is determined based on the original hash value determined at the block 410 (or based on the modified hash value determined at the block 412, if block 412 is included). In an embodiment, a client of the (modified) hash value performs one or more functions, based on the (modified) hash value. In an embodiment, the one or more functions performed by the client are functions executed within the network device to forward or analyze the data unit or packet. In an embodiment, the client performs a look up in an egress interface table such as the egress interface table 360. For example, the (modified) hash value is utilized as an index to determine a particular entry of the table 360 whose contents indicate the virtual destination port.

At block 418, a particular physical destination port corresponding to the particular virtual destination port is determined. For example, the particular physical destination port may be determined from a mapping between physical ports and virtual ports of the network device.

At block 420, the data unit or packet is caused to be egressed or transmitted from the network device via the particular physical destination port determined at block 420. In an embodiment, a data unit such as the data packet 40 is transmitted via a certain port $P_T$ of the network device implementing the method 400 (e.g., the network device 350 or some other suitable network device).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

Although the forgoing text sets forth a detailed description of numerous different embodiments, it should be understood that the scope of the patent is defined by the words of the claims set forth at the end of this patent. The detailed description is to be construed merely as providing illustrative examples and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for load balancing traffic in a network device, comprising:
    receiving a data unit at the network device via a first physical port;
    determining a first virtual port corresponding to the first physical port;
    determining an initial key based on information included in the data unit;
    determining a hash value corresponding to the data unit based on the initial key and associated with at least one virtual port of the network device, including:
        generating a depolarized initial key from the initial key by using a depolarizer that is unique, within a communication network including the network device, to the network device, and
        performing a hash function on the depolarized initial key to determine the hash value for the data unit;
    determining, based on the hash value, a second virtual port to which the data unit is to be forwarded;
    determining a second physical port corresponding to the second virtual port; and
    causing the data unit to be egressed from the network device via the second physical port.

2. The method of claim 1, wherein performing the hash function comprises performing a hash function that is common across a plurality of network devices included in the communication network.

3. The method of claim 1, wherein determining the second virtual port based on the hash value comprises:
    determining an index based on the hash value;
    indexing, using the index, an egress table to determine a particular entry of the egress table; and
    determining the second virtual port based on contents of the particular entry of the egress table.

4. The method of claim 3, wherein the hash value is a first hash value, and the method further comprises modifying the first hash value to form a modified hash value, and determining the index is based on the modified hash value.

5. The method of claim 4, further comprising determining a particular link aggregate group of the network device that corresponds to the data unit, and wherein modifying the first hash value comprises modifying the first hash value based on a number of links included in the particular link aggregate group.

6. The method of claim 4, wherein modifying the first hash value to form the modified hash value comprises selecting a subset of bits of the first hash value to form the modified hash value.

7. The method of claim 1, further comprising determining the second physical port based on a mapping between physical ports and virtual ports of the network device.

8. A load-balancing network device, comprising:
    a first network interface configured to receive a data unit;
    a mapper configured to map physical ports to virtual ports;
    a hash value generator configured to determine a first hash value corresponding to the data unit, the first hash value based on information included in the data unit and associated with one or more virtual ports of the network device;
    a hash value modifier configured to modify, based on a number of links of a link aggregate group corresponding to the data unit, the first hash value to form a modified hash value;
    a virtual port selector configured to determine, based on the modified hash value, a particular virtual port; and a second network interface configured to egress the data unit, the second network interface being connected to a particular physical port mapped to the particular virtual port by the mapper.

9. The load-balancing network device of claim 8, further comprising an egress table; and wherein the virtual port selector is configured to determine the particular virtual port by indexing the egress table with an index corresponding to the modified hash value.

10. The load-balancing network device of claim 8, wherein the hash value modifier is configured to modify the first hash value by selecting a subset of bits of the first hash value to form the modified hash value.

11. The load-balancing network device of claim 8, wherein the virtual port selector is configured to determine the particular virtual port by indexing an egress table with an index corresponding to the modified hash value.

12. A load-balancing network device, comprising:
a plurality of physical ports;
a mapper configured to map physical ports to virtual ports;
a hash value generator configured to determine a first hash value corresponding to a received data unit, the first hash value based on information included in the received data unit and associated with at least one virtual port of the network device;
a hash value modifier configured to modify, based on a number of links of a link aggregate group corresponding to the received data unit, the first hash value to form a modified hash value;
a virtual port selector configured to select, based on the modified hash value, a particular virtual port to which the received data unit is to be forwarded; and
a network interface configured to egress the received data unit, the network interface being connected to a particular physical port mapped to the particular virtual port by the mapper.

13. The load-balancing network device of claim 12, further comprising an egress table; and wherein the virtual port selector is configured to determine the particular virtual port by indexing the egress table with an index corresponding to the modified hash value.

14. The load-balancing network device of claim 12, wherein the hash value modifier is configured to modify the first hash value based on a selection of a subset of bits of the first hash value to form the modified hash value.

15. The load-balancing network device of claim 12, wherein the virtual port selector is configured to determine the particular virtual port by indexing an egress table with an index corresponding to the modified hash value.

16. A method for load balancing traffic in a network device, comprising:
receiving a data unit at the network device via a first physical port;
determining a first virtual port corresponding to the first physical port;
determining an initial key based on information included in the data unit;
determining a first hash value corresponding to the data unit based on the initial key and associated with at least one virtual port of the network device;
determining, based on the first hash value, a second virtual port to which the data unit is to be forwarded, including:
(i) determining the particular link aggregate group of the network device that corresponds to the data unit,
(ii) modifying the first hash value based on a number of links included in the particular link aggregate group to form a modified hash value,
(iii) determining an index based on the modified hash value,
(iv) indexing, using the index, an egress table to determine a particular entry of the egress table, and
(v) determining the second virtual port based on contents of the particular entry of the egress table;
determining a second physical port corresponding to the second virtual port; and
causing the data unit to be egressed from the network device via the second physical port.

17. A load-balancing network device, comprising:
a first network interface configured to receive a data unit;
a mapper configured to map physical ports to virtual ports;
a hash value generator configured to determine a hash value corresponding to the data unit by (i) generating a depolarized key from an initial key by using a depolarizer that is unique, within a communication network including the load-balancing network device, to the load-balancing network device, and (ii) performing a hash function on the depolarized key to determine the hash value, wherein the hash value is associated with one or more ports of the load-balancing network device;
a virtual port selector configured to determine, based on the hash value, a particular virtual port; and
a second network interface configured to egress the data unit, the second network interface being connected to a particular physical port mapped to the particular virtual port by the mapper.

18. A load-balancing network device, comprising:
a plurality of physical ports;
a mapper configured to map physical ports to virtual ports;
a hash value generator configured to determine a hash value corresponding to a received data unit by (i) generating a depolarized key from an initial key by using a depolarizer that is unique, within a communication network including the load-balancing network device, to the load-balancing network device, and (ii) performing a hash function on the depolarized key to determine the hash value, wherein the hash value is associated with at least one virtual port of the load-balancing network device;
a virtual port selector configured to select, based on the hash value, a particular virtual port to which the received data unit is to be forwarded; and
a network interface configured to egress the received data unit, the network interface being connected to a particular physical port mapped to the particular virtual port by the mapper.

* * * * *